United States Patent [19]
Kim

[11] Patent Number: 5,715,098
[45] Date of Patent: Feb. 3, 1998

[54] LENS SYSTEM FOR A HEAD SEPARATED TYPE CHARGE COUPLED DEVICE CAMERA

[75] Inventor: Sung-Tae Kim, Kyonggi-do, Rep. of Korea

[73] Assignee: Samsung Aerospace Industries, Ltd., Kyeongsangnam-do, Rep. of Korea

[21] Appl. No.: 582,618

[22] Filed: Jan. 4, 1996

[30] Foreign Application Priority Data

Jan. 6, 1995 [KR] Rep. of Korea ............................ 95-175
Jan. 6, 1995 [KR] Rep. of Korea ............................ 95-178

[51] Int. Cl.$^6$ .................. G02B 13/02; G02B 9/14; G02B 9/62
[52] U.S. Cl. ............. 359/748; 359/745; 359/762; 359/788; 359/789; 359/790
[58] Field of Search ..................... 359/748, 747, 359/746, 745, 788, 789, 790, 762

[56] References Cited

U.S. PATENT DOCUMENTS

| | | | |
|---|---|---|---|
| 2,366,597 | 1/1945 | Cox | 359/748 |
| 2,502,508 | 4/1950 | Cook | 359/788 |
| 5,434,713 | 7/1995 | Sato | 359/762 |

*Primary Examiner*—Scott J. Sugarman
*Attorney, Agent, or Firm*—Finnegan, Henderson, Farabow, Garrett & Dunner, L.L.P.

[57] ABSTRACT

Disclosed is a telephoto-type lens system of a head separated charge coupled device (CCD) camera, which includes a first lens group having a positive focal length, a second lens group having a negative focal length, and a third lens group. The first lens group has a first convex lens surface facing an object and an upper convex surface. The third lens group has a second lens with a negative focal length joined to a first lens with a positive focal length. An image angle greater than 29° and high definition images can be achieved with the present invention.

6 Claims, 6 Drawing Sheets

FIG.2
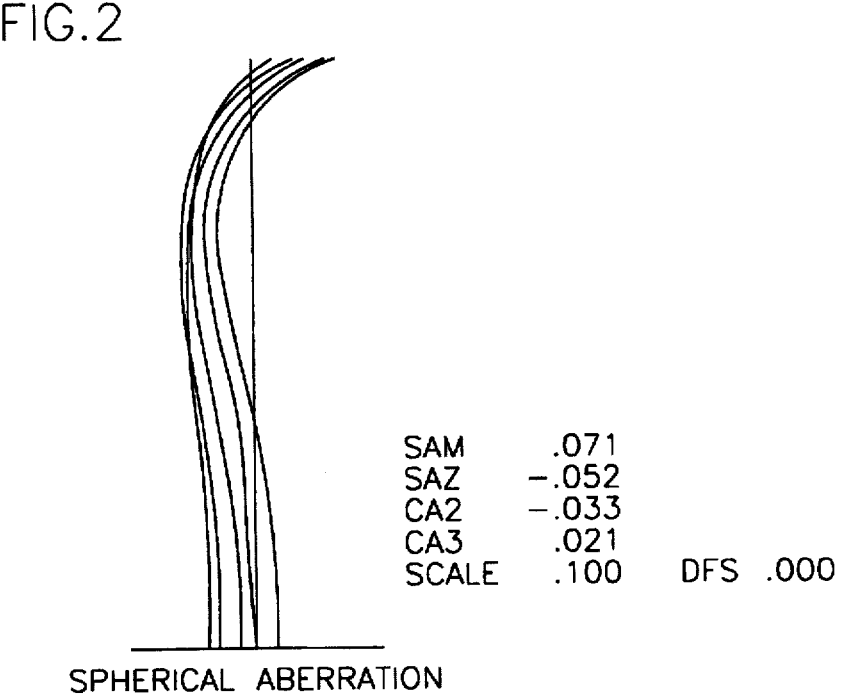
SAM .071
SAZ −.052
CA2 −.033
CA3 .021
SCALE .100     DFS .000
SPHERICAL ABERRATION
FIG.3
F=2.0  f=12  FA LENS
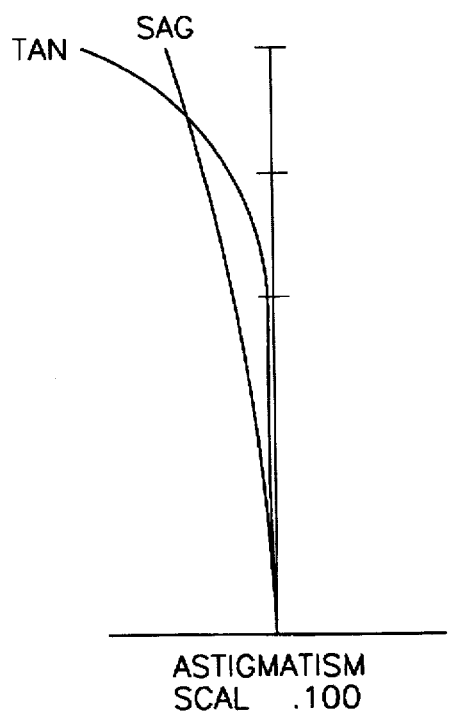
ASTIGMATISM
SCAL .100
FIG.4
DISTORTION
SCAL 1.000

FIG.7
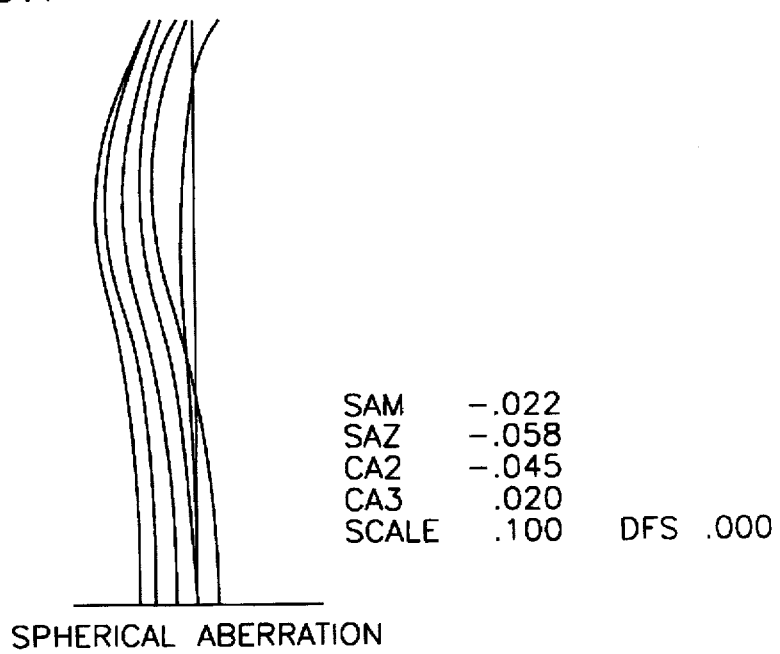
SPHERICAL ABERRATION
FIG.8
F=1.6  f=5.5  FA STANDARD LENS
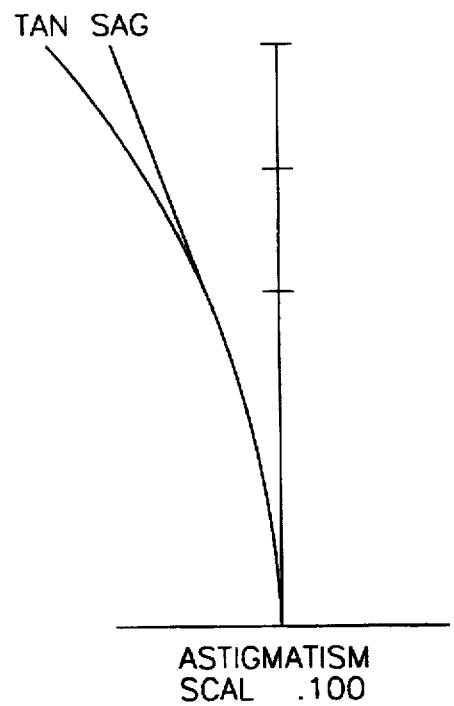
ASTIGMATISM
SCAL  .100
FIG.9
DISTORTION
SCAL  8.000

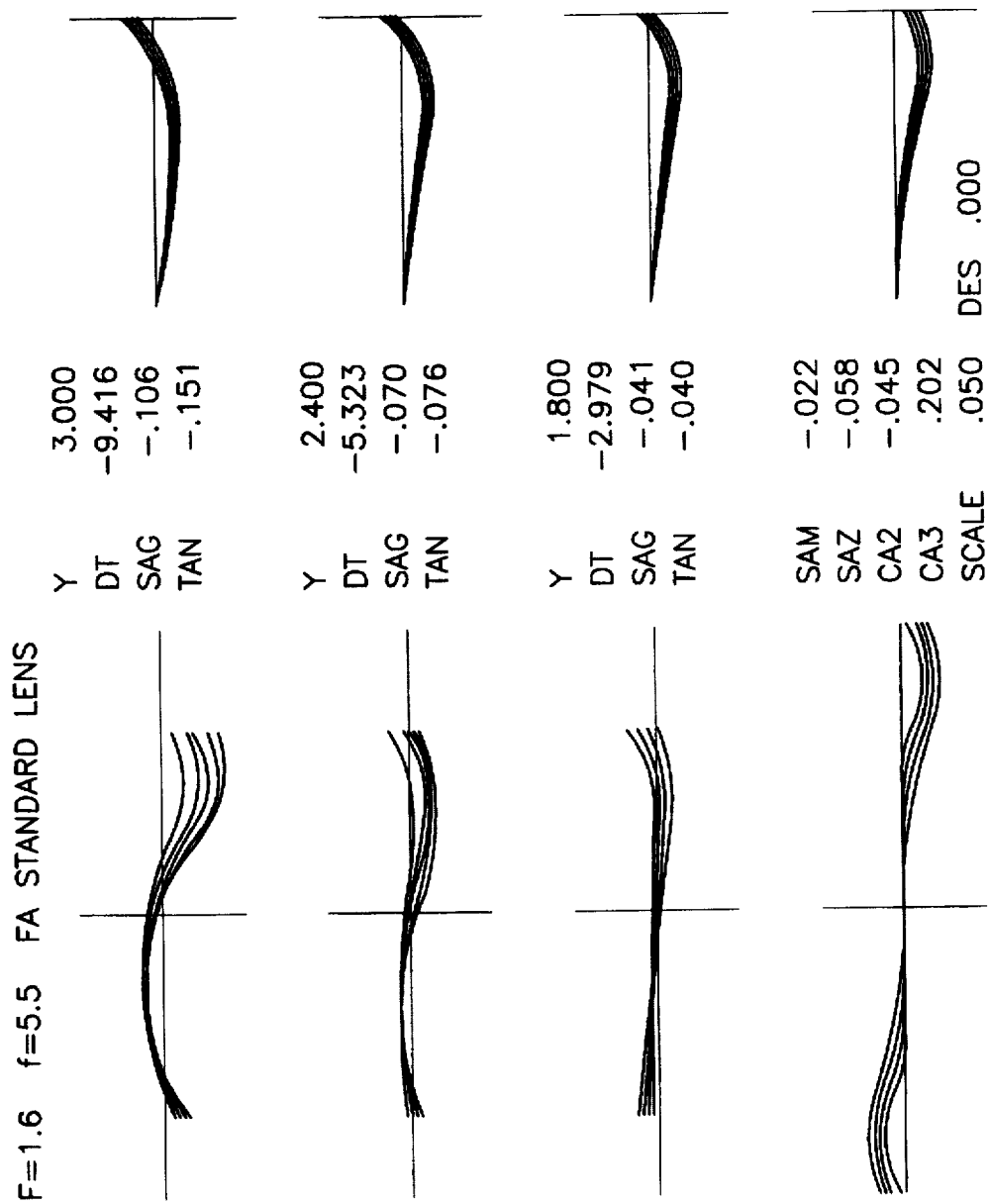
FIG.10  F=1.6  f=5.5  FA STANDARD LENS

LENS SYSTEM FOR A HEAD SEPARATED TYPE CHARGE COUPLED DEVICE CAMERA

BACKGROUND OF THE INVENTION

Field of the Invention

This invention relates to a telephoto-type and standard-type lens system of a head separated charge coupled device (CCD) camera used for general monitoring.

Description of Prior Art

The lens system of a CCD camera typically uses optional lenses such as telescopic lenses, wide viewing angle lenses, etc. With CCD technology, it is possible to obtain high definition images. The CCD camera has a lens mount for holding lenses. The typical mounts are C-mount and CS-mount, whereas the optional lenses are typically retro-focus type lenses.

The optical characteristics of retro-focus type lens are as follows: First, if the distortion aberration has a negative value, it increases for a wide view angle lens with an image angle greater than 60°. Second, the back focal length increases, thereby making it difficult to obtain high definition by improving the aberration balance. Third, the retro-focus type lens system needs a highly refractive concave lens arranged at a front position. This increases the absolute value of spherical aberration coefficient, which represents the difference between the central focal point of the lens center and the focal point of a peripheral surface of the lens. Hence, there must be provided a means to correct the aberration in the rear portion.

These characteristics make it difficult to obtain a high definition CCD camera for use in factory automation (FA). Moreover, a lens system satisfying the high definition requirements is not compact and light. To address such problems, the FA CCD camera employs a lens system designed to have an extremely small size and light weight. Additionally, CCD camera use in FA and vision system apparatus for checking the normal operation of various machines is rapidly increasing. These apparatus include a head separated lens system that employs a connecting wire making it possible to separate the lens mount and the lens system.

SUMMARY OF THE INVENTION

Accordingly, it is an object of the present invention to provide a telephoto-type lens system of a FA CCD camera, which provides an image angle greater than 29° together with high definition.

It is another object of the present invention to provide a standard-type lens system of a head separated CCD camera, which provides an image angle greater than 63° together with high definition.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a telephoto-type lens system of a head separated charge coupled device (CCD) camera. The system includes a first lens group having a positive focal length, a second lens group having a negative focal length, and a third lens group. The first lens group has a first convex lens surface facing an object and an upper convex surface. The third lens group has a first lens having a positive focal length and a second lens having a negative focal length joined to the first lens.

According to another embodiment, the present invention comprises a standard-type lens system of a head separated CCD camera. The system includes a first lens group with a first and a second lens having a negative focal length, a second lens group having a positive focal length with both sides being convex, and a third lens group having a first, a second, and a third lens. The first lens of the first lens group has a first convex lens surface facing an object and an upper concave side with a negative focal length. The second lens of the first lens group has an upper concave side with a negative focal length. The first lens of the third lens group has a negative focal length with both sides being concave. The second lens of the third lens group has a positive focal length with an upper convex side, and the third lens of the third lens group has a positive focal length with both sides being convex.

It is understood that both the foregoing general description and the following detailed description are exemplary and exemplary only, and are not restrictive of the invention as claimed.

BRIEF DESCRIPTION OF THE DRAWINGS

The accompanying drawings, which are incorporated in and constitute a part of the specification, illustrate a preferred embodiment of the invention. Together with the description, they serve to explain the objects, advantages, and principles of the invention. In the drawings:

FIG. 2 is a graph for illustrating the spherical aberration of the lens system of FIG. 1;

FIG. 3 is a graphic for illustrating the astigmatic aberration of the lens system of FIG. 1;

FIG. 4 is a graph for illustrating the distortion aberration of the lens system of FIG. 1;

FIG. 7 is a graph for illustrating the spherical aberration of the lens system of FIG. 6;

FIG. 8 is a graphic for illustrating the astigmatic aberration of the lens system of FIG. 6;

FIG. 9 is a graph for illustrating the distortion aberration of the lens system of FIG. 6; and FIG. 10 is the chromatic aberration of the lens system of FIG. 6.

DESCRIPTION OF PREFERRED EMBODIMENTS

Reference will now be made in detail to a telephoto-type lens system of a CCD camera according to the first embodiment of the present invention, as illustrated in FIGS. 1–5.

Figure 1:
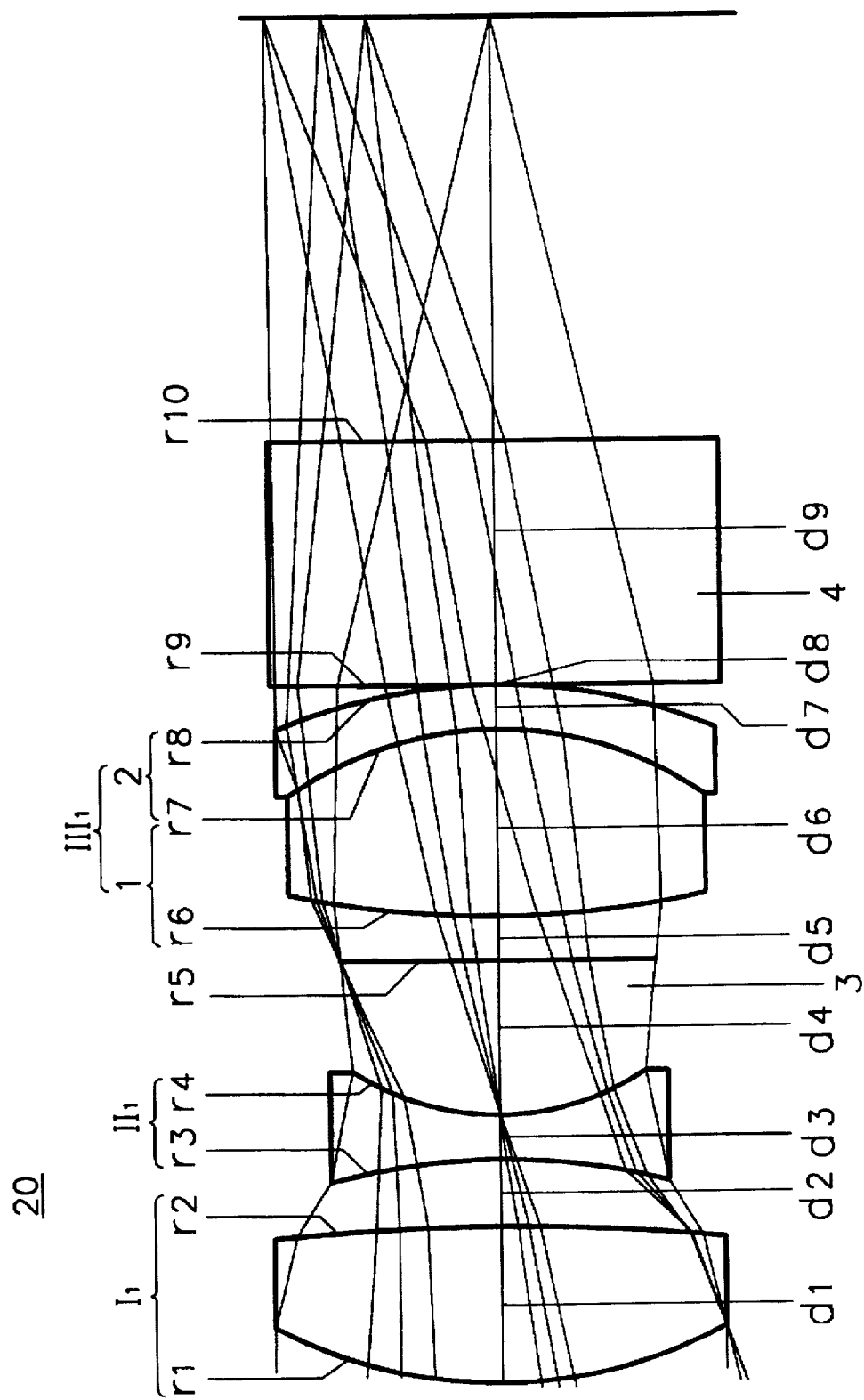
FIG. 1 is a schematic diagram for illustrating the construction of a telephoto type lens system of a CCD camera according to an embodiment of the present invention.
Figure 5:
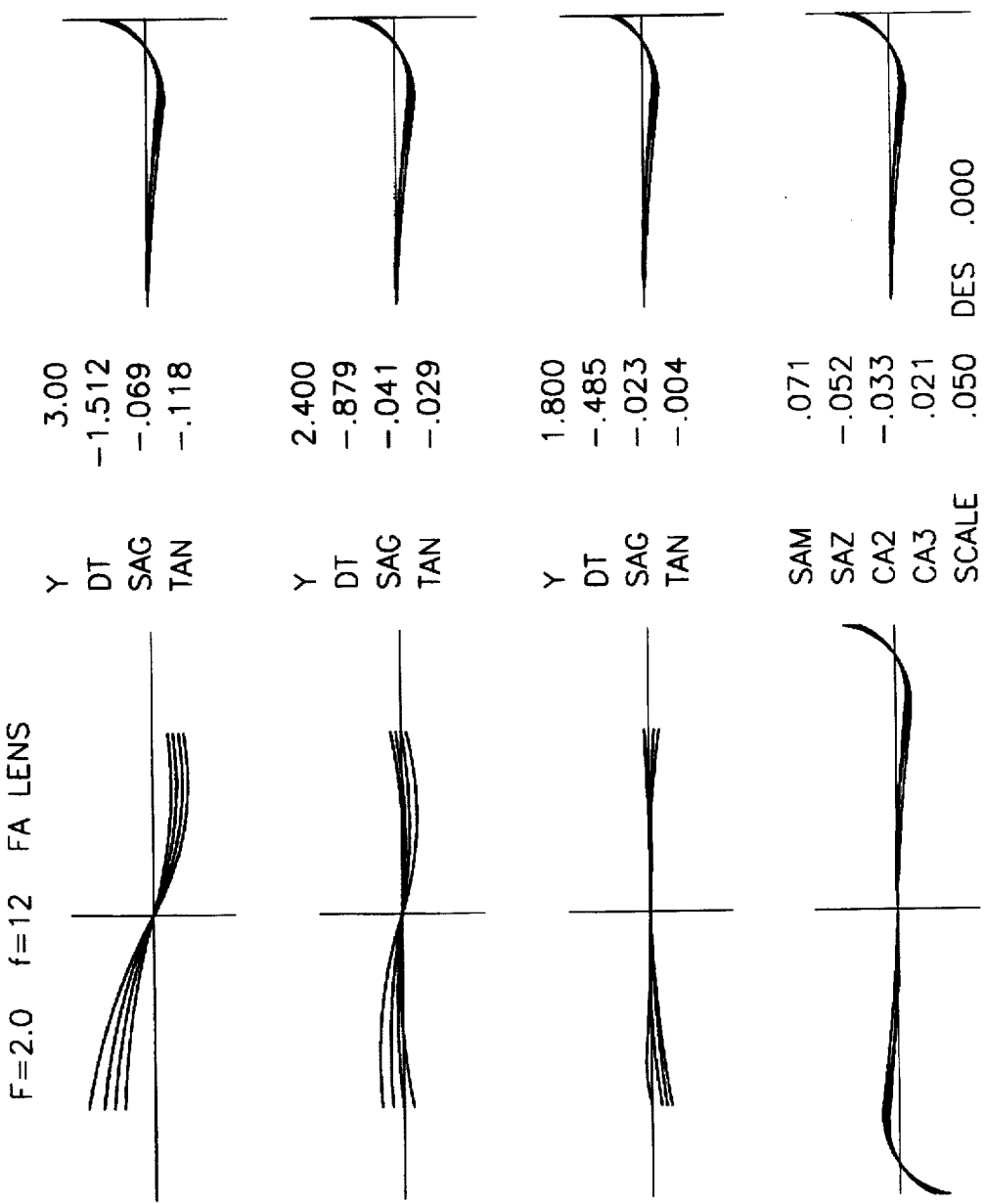
FIG. 5 is the chromatic aberration of the lens system of FIG. 1.

The exemplary embodiment of a telephoto-type lens system of the present invention is shown in FIG. 1 and designated generally by reference numeral 20.

As embodied herein, and referring to FIG. 1, the telephoto-type lens system 20 includes a first lens group I1 having a first convex lens surface r1 toward an object, an upper convex surface r2 and a positive focal length. A second lens group II1 has a negative focal length toward the object. A third lens group III1 has a first lens 1 with a positive focal length and a second lens 2 with a negative focal length. An iris diaphragm 3 is between the second lens group II1 and the third lens group III1. A filter 4 mounts behind the third lens group III1. Thus, the present embodiment provides a telephoto-type lens system 20 having a fixed focal point, which has three lens groups consisting of four lenses.

The first lens group I1 includes a convex lens with a positive focal length. The second lens group II1 includes a concave lens with a negative focal length. The third lens group III1 includes a first and a second lens 1 and 2, respectively with a positive and a negative focal length to obtain a back focal length long enough to provide for a head separated type CCD camera. The telephoto type lens system 20 of the present embodiment satisfies the relationships defined by:

$$0.3 < \frac{Fb}{F} < 0.6 \quad \text{Formula (1)}$$

$$0.2 < \frac{d5}{d4} < 0.5 \quad \text{Formula (2)}$$

The symbol F represents a combined focal length of the lens system 20, Fb the back focal length, d4 the distance between the second lens group II1 and the iris diaphragm 3, and d5 the central distance between the iris diaphragm 3 and the first lens 1 of the third lens group III1.

The first formula (1) is used to specify the combined focal length of the first lens group I1 and the second lens group II1 and the back focal length so as to make the telephoto-type lens system 20 compact. For example, if the value exceeds the upper limit, the distortion aberration rate increases. It is difficult to correct the aberration. Thus, the performance of the lens system is generally degraded. If the value falls below the lower limit, the correction of the aberration may be readily accomplished. It becomes difficult, however, to secure the proper back focal length required to make a lens system used for both color and black/white.

The second formula (2) specifies the operatively allowable distance between the second lens group II1 and the iris diaphragm 3, and between the iris diaphragm 3 and the first lens 1 of the third lens group III1. In this case, if the value exceeds the upper limit, the operatively allowable distance of the iris diaphragm 3 is secured enough, but it becomes difficult to correct the aberration. If the value falls below the lower limit, the correction of the aberration may be readily accomplished, thereby improving the performance of the lens system 20. It becomes quite difficult, however, to mount the iris diaphragm 3.

Further, the telephoto-type lens system of the present embodiment satisfies the relationship defined by:

$$3.0 < \left[ \sum_{i=1}^{2} \frac{1}{F_G 3i} \times \frac{1}{vd_{Gi}} \times 10^2 \right] < 7.0 \quad \text{Formula (3)}$$

The symbol $F_G 3_i$ represents the focal length of the "i"th lens of the third lens group III1 when numbered from the object side, and $vd_{Gi}$ the Abbe number of the above "i"th lens.

The formula (3) is used to correct the chromatic aberration, which is an optical lens defect causing color fringes because the lens material brings different colors of light to focus at different points. If the value deviates from the scope of the formula, a magnification chromatic aberration occurs in the upper part of the lenses out of the optical axis. It is especially difficult to correct the chromatic aberration of the g-line with a bluish color wavelength.

In addition, the inventive telephoto-type lens system of the head separated type CCD camera satisfies the relationship defined by:

$$80 < \left[ \sum_{i=1}^{9} \frac{1}{d_i} \times F \right] < 92 \quad \text{Formula (4)}$$

$$10 < \left[ \sum_{i=1}^{9} \frac{1}{d_i} \times Fb \right] < 15 \quad \text{Formula (5)}$$

The symbol $d_i$ represents the central distance of the "i"th lens, F the combined focal length of the lens system 20, and Fb the back focal length of the lens system 20.

The formulas (4) and (5) are used to limit the whole length of the lens system and the length of the second lens group II1. When these relationships are not satisfied, one cannot obtain a compact construction and readily correct aberration problems. Moreover, in this case, the back focal length is not secured, thereby making it difficult to construct a lens system used for both color and black/white image.

Table 1 shows the characteristic values of the present embodiment when the lens number $F_{NO}$— is 2.0, the combined focal length F 12.244, the back focal length Fb 5.8938, and the image angle W 28.83°. In Table 1, the reference symbol $r_i(i=1, 2, \ldots)$ represents the radius of the curvature of each lens surface, $d_i(i=1, 2 \ldots)$ the distance or thickness between two adjacent lens surfaces, $nd_i$ the refractive index of each lens for wavelength "d", and $vd_i$ the Abbe number of each lens for wavelength "d".

TABLE 1

| Lens Surface No. | r | d | nd | vd |
| --- | --- | --- | --- | --- |
| 1 | 6.515 | 2.11 | 1.80420 | 46.50 |
| 2 | −85.420 | 1.09 | | |
| 3 | −11.5041 | 0.70 | 1.64769 | 33.84 |
| 4 | 4.259 | 2.14 | | |
| 5 | ∞ | 0.60 | 1.77250 | 49.62 |
| 6 | 17.147 | 2.55 | | |
| 7 | −4.988 | 0.7 | 1.80518 | 25.46 |
| 8 | −8.2180 | 0.0 | | |
| 9 | ∞ | 3.46 | 1.51680 | 64.20 |
| 10 | ∞ | | | |

Reference will now be made in detail to a standard-type lens system of a CCD camera according to the second embodiment of the present invention, as illustrated in FIGS. 6–10.

Figure 6:
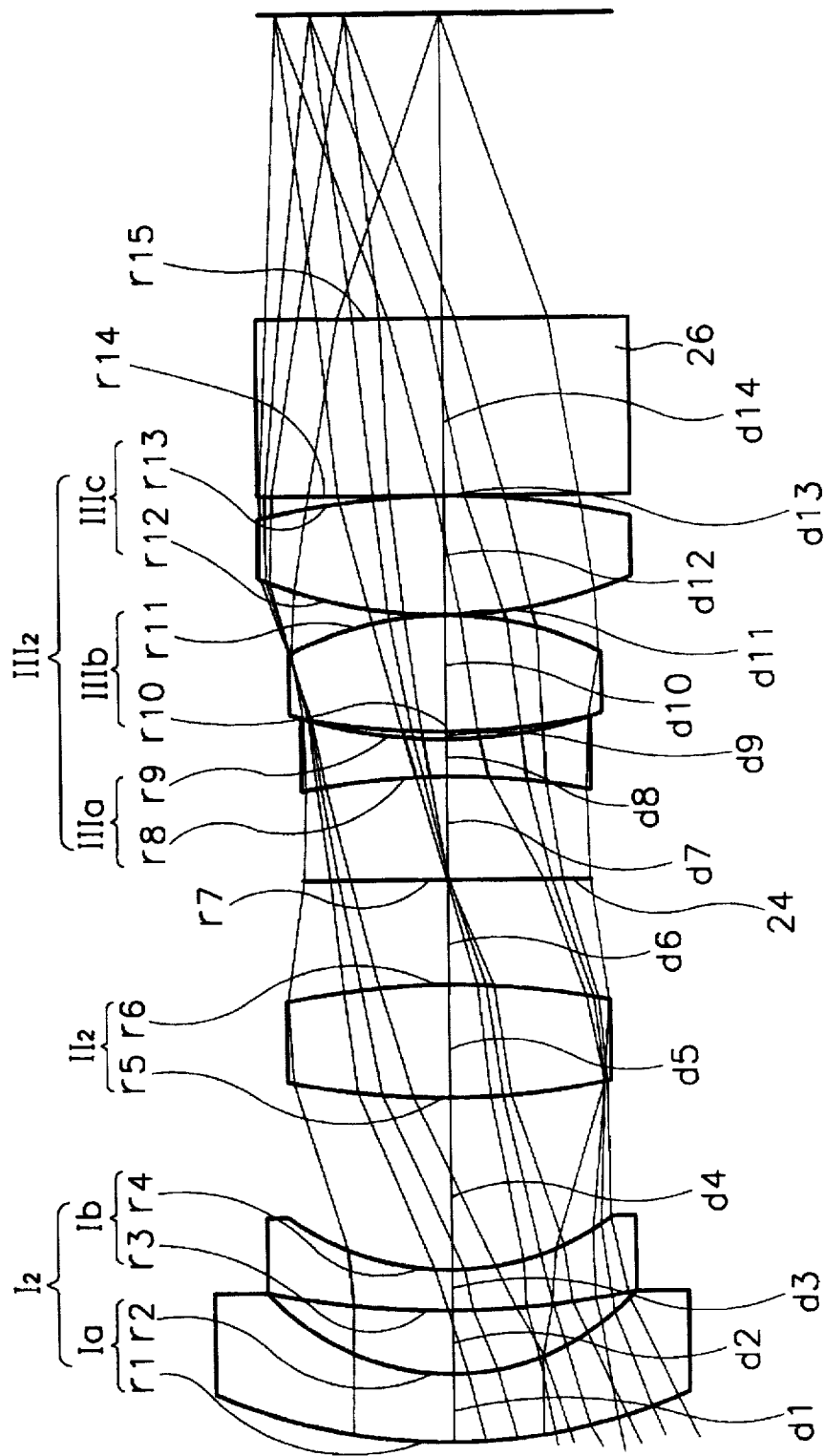
FIG. 6 is a schematic diagram for illustrating the construction of a standard type lens system of a CCD camera according to a second embodiment of the present invention.

As embodied herein, and referring to FIG. 6, the standard type lens system 22 includes a first lens group I2, a second lensgroup II2, and a third lens group III2. An iris diaphragm 24 is between the second lens group II2 and the third lens group III2. A filter 26 mounts behind the third lens group III2. The first lens group I2 includes a first lens Ia having a negative focal length with a first convex lens surface r1 facing toward the object and the upper surface r2 being concave. A second lens Ib of the first lens group I2 has a negative focal length with the upper surface r4 being concave, thus producing the combined focal length as a negative value. The second lens group II2 has a positive focal length with the both sides r5, r6 being convex. The third lens group III2 includes a first lens IIIa having a negative focal length with both sides r8, r9 being concave, a second lens IIIb having a positive focal length with the upper surface r11 being convex, and a third lens IIIc having a positive focal length with both sides r12, r13 being convex.

The present standard-type lens system of the present invention, as embodied herein, has a fixed focal length with three lens groups consisting of six lenses. The lens groups I2, II2, III2 have a negative, a positive, and a positive focal length, respectively. The first lens Ia of the first lens group I2 is a concave lens (with respect to the object) having a negative focal length, and the second lens has a positive focal length. The third lens group III2 includes a concave lens joined to a convex lens edge to edge and another convex lens behind them. In this way, the back focal length issecured enough to satisfy the standard-type lens system of a head separated CCD camera used in factory automation (FA).

This standard-type lens system should satisfy the relationship defined by:

$$0.9 < \frac{Fb}{F} < 1.3 \quad \text{Formula (6)}$$

$$0.8 < \frac{d7}{d6} < 1.2 \quad \text{Formula (7)}$$

The symbol F represents the combined focal length of the lens system, Fb the back focal length, d6 the distance between the second lens group II2 and the iris diaphragm 24, and d7 the central distance between the iris diaphragm 24 and the first lens IIIa of the third lens group III2.

The formula (6) is used to specify the combined focal length and the back focal length, which makes it possible to produce a compact lens system. In this case, if the upper limit is exceeded, the distortion aberration increases. It is difficult to correct the aberration. Therefore, the performance of the lens system is degraded. If the lower limit is exceeded, the correction of the aberration is readily accomplished. The back focal length, however, is hard to secure for use in both color and black/white.

The formula (7) specifies the distance within the operating range for mounting the iris diaphragm 24 between the first lens group namely the first lens group I2 and the second lens group II2 and the rear lens group namely third lens group III2. In this case, when the upper limit is exceeded, the operational distance of the iris diaphragm 24 is secured enough, but correction of the aberration is hard to make. If the lower limit is exceeded, the correction of the aberration may be readily accomplished, thereby improving the performance of the lens system 22. It is difficult, however, to obtain the distance for mounting the iris diaphragm 24.

Further, the standard-type lens system of the present embodiment satisfies the relationship defined by:

$$0.1 < \left[ \sum_{I=1}^{2} \frac{1}{F_{GI}} \times \frac{1}{vd_{GI}} \times 10^2 \right] < -0.3 \quad \text{Formula (8)}$$

The symbol $F_{GI}$ represents the focal length of the "i"th lens of the first lens group numbered I2 from the object, and $vd_{GI}$ the Abbe number of the "i"th lens of the third lens group III2 numbered from the object.

The formula (8) is used to correct the chromatic aberration, which is an optical lens defect causing color fringes because the lens material brings different colors of light to focus at different points. If the value deviates from the scope of the formula, a magnification chromatic aberration occurs in the upper part of the lenses out of the optical axis. It is especially difficult to correct the chromatic aberration of the g-line with a bluish color wavelength.

In addition, the inventive standard type lens system of the head separated type CCD camera satisfies the relationship defined by:

$$10 < \left[ \sum_{I=1}^{3} \frac{1}{d_I} \times F \right] < 20 \quad \text{Formula (9)}$$

$$80 < \left[ \sum_{I=8}^{13} \frac{1}{d_I} \times Fb \right] < 100 \quad \text{Formula (10)}$$

The symbol $d_I$ represents the central distance of the "i"th lens, F the combined focal length of the lens system 22, and Fb the back focal length of the lens system 22.

The formulas (9) and (10) are used to limit the whole length of the lens system 22 and the length of the second lens group II2. When these relationships are not satisfied, one cannot obtain a compact construction and readily correct aberration problems. Moreover, in this case, the back focal length is not secured, thereby making it difficult to construct a lens system used for both color and black/white image.

Table 2 shows the characteristic values of the present embodiment when the lens number $F_{NO}$ is 1.6, the combined focal length F 5.5237, the back focal length Fb 5.7602, and the image angle W 63.31°. In Table 2, the reference symbol $r_i$ (i=1, 2, . . . ) represents the radius of the curvature of each lens surface, $d_i$(i=1, 2 . . . ) the distance or thickness between two adjacent lens surfaces, $nd_i$ the refractive index of each lens for wavelength "d", and $vd_i$ the Abbe number of each lens for wavelength "d".

TABLE 2

| Lens Surface No. | r | d | nd | vd |
|---|---|---|---|---|
| I. | 11.410 | 1.30 | 1.48749 | 70.44 |
| II. | 4.635 | 1.26 | 1.51680 | 64.20 |
| III. | 27.311 | 0.80 | 1.84300 | 37.34 |
| IV. | 5.257 | 3.25 | 1.84666 | 23.78 |
| V. | 12.625 | 2.19 | 1.62041 | 60.34 |
| VI. | −16.994 | 2.01 | 1.58913 | 61.25 |
| VII. | ∞ | 1.91 | | |
| VIII. | −16.7220 | 0.70 | | |
| IX. | 10.376 | 0.24 | | |
| X. | 32.133 | 1.94 | | |
| XI. | −6.825 | 0.10 | | |
| XII. | 9.282 | 2.30 | | |
| XIII. | −15.452 | 0.00 | | |
| XIV. | ∞ | 3.46 | | |
| XV. | ∞ | | | |

Thus, there is provided the standard-type lens system for the head separated CCD camera, which has the image angle greater than 69° and produces high definition images. Also provided is the telephoto type lens system having tessa type lens groups, which has the image angle greater than 29° and produces high definition images.

Other embodiments of the invention will be apparent to those skilled in the art from consideration of the specification and practice of the invention disclosed herein. It is intended that the specification be considered as exemplary only, with a true scope and spirit being indicated by the following claims.

I claim:

1. A telephoto-type lens system of a head separated charge coupled device (CCD) camera comprising:

a first lens group having a positive focal length, the first lens group having a first convex lens surface facing an object and a convex surface facing an image and closest in the first lens group to the image;

a third lens group having a first lens having a positive focal length and a second lens having a negative focal length joined to a first lens, the first lens being oriented closer than the second lens to the first lens group; and a second lens group having a negative focal length disposed between the first lens group and the third lens group, the relationships defined by:

$$0.3 < \frac{Fb}{F} < 0.6$$

$$0.2 < \frac{d5}{d4} < 0.5$$

wherein F represents a combined focal length of the lens system, Fb the back focal length, d4 the distance between the second lens group and an iris diaphragm disposed between the second lens group and the third lens group, and d5 the central distance between the iris diaphragm and the first lens of the third lens group.

2. A telephoto-type lens system of a head separated charge coupled device (CCD) camera comprising:
   a first lens group having a positive focal length, the first lens group having a first convex lens surface facing an object and a convex surface facing an image and closest in the first lens group to the image;
   a third lens group having a first lens having a positive focal length and a second lens having a negative focal length joined to a first lens, the first lens being oriented closer than the second lens to the first lens group; and
   a second lens group having a negative focal length disposed between the first lens group and the third lens group, the relationships defined by:

$$3.0 < \left[ \sum_{i=1}^{2} \frac{1}{F_G 3_i} \times \frac{1}{vd_{Gi}} \times 10^2 \right] < 7.0$$

wherein $F_G 3_i$ represents the focal length of the "i"th lens of the third lens group when numbered from the object side, and $vd_{Gi}$ the Abbe number of the above "i"th lens.

3. A telephoto-type lens system of a head separated charge coupled device (CCD) camera comprising:
   a first lens group having a positive focal length, the first lens group having a first convex lens surface facing an object and a convex surface facing an image and closest in the first lens group to the image;
   a third lens group having a first lens having a positive focal length and a second lens having a negative focal length joined to a first lens, the first lens being oriented closer than the second lens to the first lens group; and
   a second lens group having a negative focal length disposed between the first lens group and the third lens group, the relationship defined by:

$$80 < \left[ \sum_{i=1}^{9} \frac{1}{d_i} \times F \right] < 92$$

$$10 < \left[ \sum_{i=1}^{9} \frac{1}{d_i} \times Fb \right] < 15$$

wherein $d_i$ represents the central distance of the "i"th lens, F the combined focal length of the lens system, and Fb the back focal length of the lens system.

4. A standard-type lens system of a head separated CCD camera, comprising:
   a first lens group with a first and a second lens having a negative focal length, the first lens of the first lens group with a negative focal length having a convex surface facing an object and a concave surface facing an image, the second lens of the first lens group with a negative focal length disposed further from the object than the first lens, the second lens having a concave surface facing the image;
   a third lens group having a first, a second, and a third lens, the first lens of the third lens group having a negative focal length with both surfaces being concave, the second lens of the third lens group having a positive focal length with a convex surface facing toward the image, and the third lens of the third lens group having a positive focal length with both surfaces being convex, the second lens being between the first lens and the third lens, the first lens oriented closer than the second lens to the first lens group; and
   a second lens group having a positive focal length with both surfaces being convex, the second lens group being between the first lens group and the third lens group, the relationship defined by:

$$0.9 < \frac{Fb}{F} < 1.3$$

$$0.8 < \frac{d7}{d6} < 1.2$$

wherein F represents the combined focal length of the lens system, Fb the back focal length, d6 the distance between the second lens group and the iris diaphragm disposed between the second lens group and the third lens group, and d7 the central distance between the iris diaphragm and the first lens of the third lens group.

5. A standard-type lens system of a head separated CCD camera, comprising:
   a first lens group with a first and a second lens having a negative focal length, the first lens of the first lens group with a negative focal length having a convex surface facing an object and a concave surface facing an image, the second lens of the first lens group with a negative focal length disposed further from the object than the first lens, the second lens having a concave surface facing the image;
   a third lens group having a first, a second, and a third lens, the first lens of the third lens group having a negative focal length with both surfaces being concave, the second lens of the third lens group having a positive focal length with a convex surface facing toward the image, and the third lens of the third lens group having a positive focal length with both surfaces being convex, the second lens being between the first lens and the third lens, the first lens oriented closer than the second lens to the first lens group; and
   a second lens group having a positive focal length with both surfaces being convex, the second lens group being between the first lens group and the third lens group, the relationship defined by:

$$0.1 < \left[ \sum_{i=1}^{2} \frac{1}{F_{Gi}} \times \frac{1}{vd_{Gi}} \times 10^2 \right] < -0.3$$

wherein $F_{Gi}$ represents the focal length of the "i"th lens of the first lens group numbered from the object, and $vd_{Gi}$ the Abbe number of the "i"th lens of the third lens group numbered from the object.

6. A standard-type lens system of a head separated CCD camera, comprising:
   a first lens group with a first and a second lens having a negative focal length, the first lens of the first lens group with a negative focal length having a convex surface facing an object and a concave surface facing an image, the second lens of the first lens group with a negative focal length disposed further from the object than the first lens, the second lens having a concave surface facing the image;

a third lens group having a first, a second, and a third lens, the first lens of the third lens group having a negative focal length with both surfaces being concave, the second lens of the third lens group having a positive focal length with a convex surface facing toward the image, and the third lens of the third lens group having a positive focal length with both surfaces being convex, the second lens being between the first lens and the third lens, the first lens oriented closer than the second lens to the first lens group; and a second lens group having a positive focal length with both surfaces being convex, the second lens group being between the first lens group and the third lens group, the relationship defined by:

$$10 < \left[ \sum_{i=1}^{3} \frac{1}{d_i} \times F \right] < 20$$

$$80 < \left[ \sum_{i=8}^{13} \frac{1}{d_i} \times Fb \right] < 100$$

wherein $d_i$ represents the central distance of the "i"th lens, F the combined focal length of the lens system, and Fb the back focal length of the lens system.

* * * * *

UNITED STATES PATENT AND TRADEMARK OFFICE
CERTIFICATE OF CORRECTION

PATENT NO. : 5,715,098
DATED : February 3, 1998
INVENTOR(S) : Sung-Tae KIM

It is certified that error appears in the above-identified patent and that said Letters Patent is hereby corrected as shown below:

Claim 2, Column 7, lines 31 - 32, in the formula, $$"\sum_{i=1}^{2}" \text{ should read } --\sum_{I=1}^{2}--.$$

Signed and Sealed this

Twenty-seventh Day of April, 1999

Attest:

Q. TODD DICKINSON

*Attesting Officer*     *Acting Commissioner of Patents and Trademarks*